(12) United States Patent
Nishida

(10) Patent No.: US 7,324,247 B2
(45) Date of Patent: Jan. 29, 2008

(54) IMAGE PROCESSING APPARATUS, IMAGE PROCESSING PROGRAM AND STORAGE MEDIUM STORING THE PROGRAM

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1023 days.

(21) Appl. No.: 10/389,974

(22) Filed: Mar. 18, 2003

(65) Prior Publication Data

US 2003/0179409 A1 Sep. 25, 2003

(30) Foreign Application Priority Data

Mar. 22, 2002 (JP) ............... 2002-081361

(51) Int. Cl.
*H04N 1/46* (2006.01)
*G06K 15/00* (2006.01)
(52) U.S. Cl. ............... 358/540; 358/536; 358/3.08
(58) Field of Classification Search ............... 358/1.9, 358/534, 536, 538, 539, 523, 3.3, 3.31, 2.1, 358/3.08, 540, 1.2, 1.15, 3.06; 382/162, 382/167, 166, 165, 254, 272, 302
See application file for complete search history.

(56) References Cited

U.S. PATENT DOCUMENTS

| | | | | |
|---|---|---|---|---|
| 3,668,311 | A * | 6/1972 | Bigliano et al. | 358/534 |
| 4,722,008 | A * | 1/1988 | Ibaraki et al. | 382/192 |
| 4,741,046 | A * | 4/1988 | Matsunawa et al. | 382/176 |
| 5,029,020 | A * | 7/1991 | Norder et al. | 358/474 |
| 5,067,165 | A | 11/1991 | Nishida | |
| 5,204,915 | A | 4/1993 | Nishida | |
| 5,313,528 | A | 5/1994 | Nishida | |
| 5,317,649 | A | 5/1994 | Nishida | |
| 5,497,432 | A | 3/1996 | Nishida | |
| 5,710,830 | A * | 1/1998 | Holeva | 382/173 |
| 5,715,382 | A * | 2/1998 | Herregods et al. | 358/1.18 |
| 5,729,632 | A * | 3/1998 | Tai | 382/237 |
| 5,737,455 | A * | 4/1998 | Harrington et al. | 382/284 |
| 5,956,157 | A * | 9/1999 | Tai | 358/3.24 |
| 6,041,138 | A | 3/2000 | Nishida | |
| 6,078,697 | A * | 6/2000 | Ng | 382/275 |
| 6,160,913 | A * | 12/2000 | Lee et al. | 382/176 |
| 6,198,545 | B1 * | 3/2001 | Ostromoukhov et al. | 358/3.09 |
| 6,256,051 | B1 * | 7/2001 | Asada et al. | 347/131 |
| 6,289,364 | B1 * | 9/2001 | Borg et al. | 715/526 |
| 6,307,962 | B1 * | 10/2001 | Parker et al. | 382/170 |
| 6,424,746 | B1 | 7/2002 | Nishida | |
| 6,498,660 | B2 * | 12/2002 | Haltmaier | 358/2.1 |

(Continued)

FOREIGN PATENT DOCUMENTS

JP 6-62230 3/1994

(Continued)

*Primary Examiner*—Madeleine A V Nguyen
(74) *Attorney, Agent, or Firm*—Dickstein Shapiro LLP

(57) ABSTRACT

An image processing apparatus includes a reduced image generating part generating a reduced image having a lower resolution than that of an original digital image. A first extracting part distinctly extracts a first foreground image and a first background image from the reduced image. A first continuous tone converting part converts, into a continuous tone, a halftone dot pattern of the first background image extracted from the reduced image. A combining part combines the first background image of which halftone dot pattern is converted into the continuous tone and an image based on the first foreground image extracted by the first extracting part.

49 Claims, 9 Drawing Sheets

U.S. PATENT DOCUMENTS

| | | |
|---|---|---|
| 6,628,819 B1 | 9/2003 | Huang |
| 6,641,053 B1 * | 11/2003 | Breidenbach et al. ........ 235/494 |
| 6,731,800 B1 * | 5/2004 | Barthel et al. .............. 382/176 |
| 6,738,517 B2 * | 5/2004 | Loce et al. ................. 382/209 |
| 6,747,758 B1 | 6/2004 | Nishida |
| 6,760,126 B1 * | 7/2004 | Kritayakirana et al. ...... 358/2.1 |
| 6,809,839 B1 * | 10/2004 | Earl et al. ..................... 358/1.9 |
| 6,865,001 B2 * | 3/2005 | Long et al. ..................... 359/2 |
| 6,975,411 B2 * | 12/2005 | Foster et al. ................. 358/1.1 |
| 7,010,155 B2 * | 3/2006 | Koakutsu et al. ........... 382/137 |
| 7,016,552 B2 * | 3/2006 | Koyama ..................... 382/289 |
| 7,024,043 B1 * | 4/2006 | Fujimoto et al. ........... 382/237 |
| 7,031,011 B2 * | 4/2006 | Shimazawa et al. ....... 358/1.15 |
| 7,057,764 B1 * | 6/2006 | Sakaue ....................... 358/1.9 |
| 7,085,006 B2 * | 8/2006 | Yokoyama et al. .......... 358/1.9 |
| 7,120,297 B2 * | 10/2006 | Simard et al. .............. 382/166 |
| 7,221,799 B2 * | 5/2007 | Okubo et al. ................ 382/199 |
| 2001/0000711 A1 * | 5/2001 | Queiroz et al. ............. 382/264 |
| 2002/0071131 A1 | 6/2002 | Nishida |
| 2002/0081023 A1 * | 6/2002 | Uchida ........................ 382/165 |
| 2003/0068077 A1 * | 4/2003 | Koakutsu et al. ........... 382/135 |
| 2003/0090742 A1 * | 5/2003 | Fukuda et al. .............. 358/448 |
| 2004/0066538 A1 * | 4/2004 | Rozzi .......................... 358/2.1 |
| 2004/0080789 A1 * | 4/2004 | Anderson .................... 358/2.1 |
| 2004/0096122 A1 * | 5/2004 | Curry et al. ................. 382/302 |
| 2005/0083553 A1 * | 4/2005 | Silverbrook et al. ......... 358/2.1 |
| 2006/0078220 A1 * | 4/2006 | Okubo et al. ................ 382/261 |

FOREIGN PATENT DOCUMENTS

| | | |
|---|---|---|
| JP | 10-208038 | 8/1998 |
| JP | 11-41469 | 2/1999 |
| JP | 2001-211327 | 8/2001 |

* cited by examiner

FIG.5
(a) 
R
(b) 
R
(c) 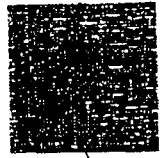
R
(d) 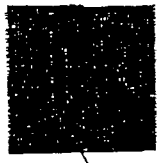
R
FIG.6
(a) 
R
(b) 
R
(c) 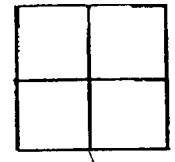
R

IMAGE PROCESSING APPARATUS, IMAGE PROCESSING PROGRAM AND STORAGE MEDIUM STORING THE PROGRAM

BACKGROUND OF THE INVENTION

1. Field of the Invention

The present invention generally relates to image forming apparatuses, image processing programs interpreted and executed by a computer provided in the image forming apparatus, and storage media storing the image processing programs, and more particularly to a technique of improving granularity and moiré phenomenon of an output image when outputting, from an image output apparatus such as a printer, a digital image obtained by inputting a printed document to an image reading apparatus such as a scanner, for example.

2. Description of the Related Art

For example, in a case where a digital image, which is obtained by inputting a printed document to an image reading apparatus such as a scanner, is displayed on a display or output from an image output apparatus such as a printer, when no process is performed on the digital image or if performed, only image processing not relating to the image quality, such as scaling and rotation, is performed, there is a possibility that degradation of a reproduced image occurs such as occurrence of moiré phenomena and degradation of granularity.

When a halftone area of the printed document is formed with a dot pattern generated through applying screening (such as the dither method), the error diffusion method or the like, the above-described phenomena occur due to lack of consistency between such image processing and the image processing such as a halftone process performed in the image output apparatus, a printer, for example.

In order to improve the image quality by avoiding such problems of image degradation, the halftone area expressed with the dot pattern should be converted into continuous tone expression. Such process for improving the image quality is conventionally embedded in an image apparatus such as a digital multi-functional apparatus. However, it should be noted that important edges, graphics such as letters and line work, and the like must not be gradated.

As for related prior art, there are Japanese Laid-Open Patent Applications No. 6-62230, No. 10-208038, No. 11-41469, and No. 2001-211327.

Japanese Laid-Open Patent Applications No. 6-62230 and No. 10-208038 disclose techniques of separating a letter area and an image area, and performing a linear filter process having a different frequency characteristic for each pixel according to the image characteristics surrounding the pixel, thereby converting the halftone area into continuous tone expression.

Additionally, in Japanese Laid-Open Patent Applications No. 11-41469 and No. 2001-211327, methods of using the wavelet transform are devised.

However, with the recent growing popularity of network environments, a digital image input through an image reading apparatus is sent to a distant place via a network, and a recipient edits/reuses/prints out/resends the image input through the unknown image reading apparatus on a personal computer, for example. In such a network environment, new technical problems that did not exist in the past arise.

Further, it should be noted that the techniques disclosed in the above-described Japanese Laid-Open Patent Applications No. 6-62230, No. 10-208038, No. 11-41469, and No. 2001-211327 fail to consider such a network environment.

The technical problems arising in the network environment are as follows.

(1) To achieve a practical processing speed even in a case where an image input through an unknown image reading apparatus is edited/reused/printed out/resent by a personal computer, for example, and the functions for improving granularity and moiré phenomena of the output image are realized by software that is installed in or interpreted by a personal computer.

In the network environment, an image input at a distant place and sent via a network is subjected to an image quality improving process on the personal computer and then often saved as a file, output by a printer, and even sent via the network. In this case, when such functions are realized by software that is installed in or interpreted by the personal computer, it is difficult to achieve a practical processing speed. For example, when the above-described linear filter and wavelet transform are realized by software and applied to an A4 size full-color document image, the computation time becomes impractical as the resolution is increased.

Therefore, it is desirable that a practical processing speed be achieved even when the functions described above are realized by software.

(2) To attenuate the difference in the characteristics between an image processing apparatus on a sender's side of an image and an image processing apparatus on a recipient's side of the image.

In a stand-alone image processing apparatus, image processing algorithms and parameters are often designed according to the characteristics of the apparatus. However, an image processing system optimized for a specific model does not always exert the effect on models having different characteristics. In the network environment, image processing apparatuses, image input apparatuses such as a scanner in particular, possess various characteristics. Further, when an image is sent from a distant place, the characteristics may even be unknown. Therefore, in a case where an image input by an image input apparatus on the sender's side of the image and including correction information depending on the characteristics of the image input apparatus is subjected to a reproduction process by an image processing apparatus that is on the recipient's side of the image and possesses different characteristics from those of the sender's side image input apparatus, or where the reproduction process is performed on an image including unknown correction information, the image quality to be reproduced may be significantly degraded, which may result in degradation of the granularity and occurrence of moiré phenomena of the output image.

Accordingly, even in such a case where an image input by an image input apparatus on the sender's side of the image and including correction information depending on the characteristics of the image input apparatus is subjected to a reproduction process by an image processing apparatus that is on the recipient's side of the image and possesses different characteristics from those of the sender's side image input apparatus, or where the reproduction process is performed on an image including unknown correction information, it is desired to easily apply an image quality improving process that improves the granularity and moiré phenomena of an output image so as to obtain a satisfactory image quality.

(3) To realize image reproduction with a good image quality on the recipient's side of the image without depending on details (types, kinds) of a halftone processing method performed on the-sender's side of the image.

When the method of the halftone process generating the dot pattern and the parameters (threshold value matrix of dither, filter factors of error diffusion, screen angles, dot cycles and the like) are recognized, it is possible to use the method specialized therefor when performing the image reproduction process in an image processing apparatus. However, in a case where targets are document images printed using unknown processes such as printed books, magazines and newspapers, when the sensitivity for high frequency of the image input apparatus is not adequate or the resolution is low, there is a possibility that the features of the halftone pattern cannot be extracted.

Accordingly, it is desired to realize image reproduction with a good image quality by improving the granularity and moiré phenomena of the output image on the recipient's side of the image irrespective of a processing method used in the halftone processing method of the image input by the image input apparatus on the sender's side of the image.

SUMMARY OF THE INVENTION

It is a general object of the present invention to provide an improved and useful image forming apparatus, image processing program, and storage medium storing the image processing program in which the above-mentioned problems are eliminated.

It is another and more specific object of the present invention to achieve a practical processing speed even when the functions for editing/reusing/printing out/re-sending, by a personal computer, for example, an output image input through an unknown image reading apparatus and improving granularity and moiré phenomenon of an output image are realized in software.

It is still another object of the present invention to easily apply an image quality improving process improving granularity and moiré phenomena of the output image so as to obtain a satisfactory image quality even in a case where an image input by an image input apparatus on a sender's side of the image and including correction information depending on the characteristics of the image input apparatus is subjected to a reproduction process by an image processing apparatus that is on a recipient's side of the image and possesses different characteristics from those of the sender's side image input apparatus, or where the reproduction process is performed on an image including unknown correction information.

It is a further object of the present invention to realize image reproduction with a good image quality by improving the granularity and moiré phenomena of the output image on the recipient's side of the image irrespective of the processing method used in a halftone processing method of the image input by the image input apparatus on the sender's side of the image.

In order to achieve the above-mentioned objects, according to one aspect of the present invention, there is provided an image processing apparatus, including: a reduced image generating part generating a reduced image having a lower resolution than that of an original image, the original image being a digital image; a first extracting part distinctly extracting a first foreground image and a first background image from the reduced image; a first continuous tone converting part-converting, into a continuous tone, a halftone dot pattern of the first background image extracted from the reduced image; and a combining part combining the first background image of which halftone dot pattern is converted into a continuous tone by a first continuous tone converting part and an image based on the first foreground image extracted by the first extracting part.

It should be noted that the "image based on the first foreground image extracted by the first extracting part" may be the first foreground image extracted by the first extracting part or an image in an area of the original image which area corresponds to the extracted image.

Accordingly, a process of distinctly extracting the foreground image and the background image is performed on the reduced image, and the background image extracted from the reduced image is subjected to a process of converting the halftone dot pattern of the background image into a continuous tone. Then, the image of which halftone dot pattern is converted into a continuous tone and the image based on the foreground image extracted from the reduced image are combined. Hence, the present invention includes the following advantages.

(1) The greater part of the background image of which halftone dot pattern is converted into a continuous tone is the image that is extracted from the reduced image. Hence, in a case where the functions for improving the granularity and moiré phenomena of an output image are realized by software, it is possible to achieve a practical processing speed.

(2) The greater part of the background image of which halftone dot pattern is converted into the continuous tone is the image extracted from the reduced image. Thus, traces of various image processing included in the original image become inconspicuous. Hence, even in a case where an image that is input by an image input apparatus on a sender's side of the image and includes correction information depending on the characteristics of the image input apparatus, is subjected to a reproduction process by an image output apparatus on a recipient's side of the image and having the characteristics different from those of the image input apparatus on the sender's side, or a case where the reproduction process is performed on an image including unknown correction information, it is possible to easily apply the image quality improving process that improves the granularity and moiré phenomena of the output image. Accordingly, it is possible to obtain satisfactory image quality.

(3) The greater part of the background image of which halftone dot pattern is converted into the continuous tone is the image extracted from the reduced image. Thus, the traces of the various image processing included in the original image become inconspicuous. Hence, irrespective of a processing method used in the halftone processing method of the image input by the image input apparatus on the sender's side of the image, without depending on the processing method, it is possible to realize, by the image output apparatus on the recipient's side of the image, the image reproduction with a good image quality where the granularity and moiré phenomena of the output image are improved.

Additionally, in the image processing apparatus according to the present invention, the first continuous tone converting part may include: a window setting part setting a window having a predetermined size to the extracted first background image; and a converting part setting an average value of color in each window to the pixels in the window and thereby converting the halftone dot pattern into a continuous tone.

Accordingly, the window is set to an image, and the average value of color in the window is set to the pixels in the window. Hence, irrespective of image improving information included in the original image, it is possible to significantly improve the result of the image quality improving process that improves the granularity and moiré phenomena of the output image.

In addition, the converting part may set a first run segmenting a line along a first direction in the window so as to obtain an average value of color for each first run, set a second run segmenting a line along a second direction orthogonal to the first direction in the window so as to obtain an average value of color for each second run, and thereby obtain the average value of color in the window.

Accordingly, it is possible to obtain the average value of color in the window based on the average value of color of each run that segmentizes the lines in the vertical and horizontal directions, for example. Hence, it is possible to obtain the average value of color in the window with a good accuracy. Thus, it is possible to perform the image reproduction with a good image quality.

Further, the first continuous tone converting part may include: an edge detecting part detecting an edge from the first background image subjected to a continuous tone conversion process of converting the halftone dot pattern of the extracted first background image into a continuous tone; a comparing and determining part comparing the detected edge with an edge of the first background image before the continuous tone conversion process and determining whether or not the detected edge exists in the first background image before the continuous tone conversion process; and a re-converting part performing the continuous tone conversion process again on surroundings of the detected edge when, as a result of the comparison and determination, it is determined that the detected edge does not exist in the first background image before the continuous tone conversion process.

In the process of setting the window to an image and setting the average value of color in the window to the pixels in the window, there is a possibility that the average value of color of a window and that of the adjacent window are far different, and an edge that does not exist in the image before the continuous tone conversion process is generated in the image on which the continuous tone conversion process is performed. Thus, in the present invention, when the edge that does not exist in the image before the continuous tone conversion process is found in the image on which the continuous tone conversion process is performed, the continuous tone conversion process is performed again on the surroundings of the detected edge, and thereby the image on which the continuous tone conversion process is performed is approximated to the image before the continuous tone conversion process. Thus, it is possible to perform the image reproduction with a good image quality.

Additionally, the comparing and determining part may, for each pixel, obtain the difference between an edge strength of the background image before the continuous tone conversion process and an edge strength calculated by the edge detecting part through subtracting the edge strength of the background image from the calculated edge strength and, when the difference is equal to or more than a predetermined threshold value, the comparing and determining part may determine that the detected edge does not exist in the first background image before the continuous tone conversion process.

By using such a determination method, it is easily determined whether or not the edge that does not exist in the image before the continuous tone conversion process exists in the image on which the continuous tone conversion process is performed.

In addition, the re-converting part may set the size of the window set by the window setting part smaller than the size in the previous continuous tone conversion process Accordingly, when performing the continuous tone conversion process again, it is possible to make the average value of the color of a window and that of the adjacent window close to each other. Thus, the continuity of pixels defined as the average values of the different windows is maintained. Hence, it is possible to perform the image reproduction with a good image quality.

In the image processing apparatus according to the present invention, the first foreground image and the first background image may be distinctly extracted by the first extracting part through performing extraction of an edge, binarization, or the combination of the extraction of the edge and the binarization on the reduced image.

Accordingly, it is possible to ensure the effects of the image processing apparatus of the present invention.

The image processing apparatus according to the present invention may further include: a second extracting part distinctly extracting a second foreground image and a second background image from an area of the original image, the area corresponding to the first foreground image extracted from the reduced image; and a second continuous tone converting part converting, into a continuous tone, a halftone dot pattern of the second background image extracted from the area of the original image, wherein the combining part combines the first background image of which halftone dot pattern is converted into the continuous tone by the first continuous tone converting part, the second foreground image extracted by the second extracting part, and the second background image of which halftone dot pattern is converted into the continuous tone by the second continuous tone converting part.

Accordingly, with respect to the first foreground image extracted from the reduced image, a process of distinctly extracting a second foreground image and a second background image from the original image is further performed. Thus, a more accurate distinction between the foreground image and the background image is made.

Additionally, in the image processing apparatus according to the present invention, at least one of the first and second continuous tone converting parts may include: a window setting part setting a window having a predetermined size to one of the extracted first and second background images; and a converting part setting an average value of color in each window to the pixels in the window and thereby converting the halftone dot pattern into a continuous tone.

Accordingly, the window is set to an image, and the average value of a color in the window is set to the pixels in the window. Hence, irrespective of the image improving information included in the original image, it is possible to significantly improve the result of-the image quality improving process that improves the granularity and moiré phenomena of the output image.

In addition, the above-described converting part may set a first run segmenting a line along a first direction in the window so as to obtain an average value of color for each first run, set a second run segmenting a line along a second direction orthogonal to the first direction in the window so as to obtain an average value of color for each second run, and thereby obtain the average value of color in the window.

Accordingly, it is possible to obtain the average value of color in the window based on the average value of color of each run that segments the lines in the vertical and horizontal directions, for example. Hence, it is possible to obtain the average value of color in the window with a good accuracy.

Further, in the image processing apparatus according to the present invention, at least one of the first and second continuous tone converting parts may include: an edge detecting part detecting an edge from the corresponding one of the first and second background images subjected to a continuous tone conversion process of converting the halftone dot pattern of the one of the extracted first and second background images into the continuous tone; a comparing and determining part comparing the detected edge with an edge of the one of the first and second background images before the continuous tone conversion process and determines whether or not the detected edge exists in the one of the first and second background images before the continuous tone conversion process; and a re-converting part performing the continuous tone conversion process again on surroundings of the detected edge when, as a result of the comparison and determination, it is determined that the detected edge does not exist in the one of the first and second background images before the continuous tone conversion process.

In the process of setting the window to an image and setting the average value of the color in the window to a pixel in the window, there is a possibility that the average value of color of one window and that of the adjacent window are far different, and an edge that does not exist in the image before the continuous tone conversion process is generated in the image on which the continuous tone conversion process is performed. Thus, in the present invention, when the edge that does not exist in the image before the continuous tone conversion process is found in the image on which the continuous tone conversion process is performed, the continuous tone conversion process is performed again on the surroundings of the detected edge, and thereby the image on which the continuous tone conversion process is performed is approximated to the image before the continuous tone conversion process. Thus, it is possible to perform the image reproduction with a good image quality.

Additionally, in the image processing apparatus according to the present invention, for each pixel, the comparing and determining part may obtain the difference between an edge strength of the background image before the continuous tone conversion process and an edge strength calculated by the edge detecting part through subtracting the edge strength of the background image from the calculated edge strength and, when the difference is equal to or more than a predetermined threshold value, determine that the detected edge does not exist in the one of the first and second background images before the continuous tone conversion process.

By using such a determination method, it is easily determined whether or not the edge that does not exist in the image before the continuous tone conversion process exists in the image on which the continuous tone conversion process is performed.

In addition, the re-converting part may set the size of the window set by the window setting part smaller than the size in the previous continuous tone conversion process.

Accordingly, when performing the continuous tone conversion process again, it is possible to make the average value of the color of one window and that of the adjacent window close to each other. Thus, the continuity of pixels defined as the average values of the different windows is maintained. Hence, it is possible to perform the image reproduction with a good image quality.

In the image processing apparatus according to the present invention, each of the first and second extracting parts may distinctly extract the foreground image (the first and second foreground images, respectively) and the background image (the first and second background image, respectively) through the extraction of the edge, the binarization, or the combination of the extraction of the edge and the binarization on the reduced image.

Further, according to another aspect of the present invention, there is provided an image processing program interpreted by a computer and including the instructions of: causing the computer to generate a reduced image having a lower resolution than that of an original image, the original image being a digital image; causing the computer to distinctly extract a first foreground image and a first background image from the reduced image; causing the computer to convert, into a continuous tone, a halftone dot pattern of the first background image extracted from the reduced image; and causing the computer to combine the first background image of which halftone dot pattern is converted into the continuous tone by the instruction of causing the computer to convert the halftone dot pattern into the continuous tone and an image based on the first foreground image extracted by the instruction of causing the computer to distinctly extract the first foreground image and the first background image.

Additionally, according to another aspect of the present invention, there is provided a processor-readable storage medium storing the image processing program as described above.

According to the above-mentioned invention, the same advantages as described above can be achieved.

Other objects, features and advantages of the present invention will become more apparent from the following detailed description when read in conjunction with the following drawings.

BRIEF DESCRIPTION OF THE DRAWINGS

FIG. 5 is a schematic diagram showing local areas in a window;

FIG. 6 is a schematic diagram showing cases where edges emerge in the local areas in the window;

DETAILED DESCRIPTION OF THE PREFERRED EMBODIMENTS

A description will be given of embodiments of the present invention with reference to FIGS. 1 through 9.

An image processing apparatus embodying the present invention performs an imaging process such that the operation is controlled by an image processing program installed in or interpreted and executed by the computer. In the embodiments, a storage medium storing such an image processing program will also be introduced.

Figure 1:
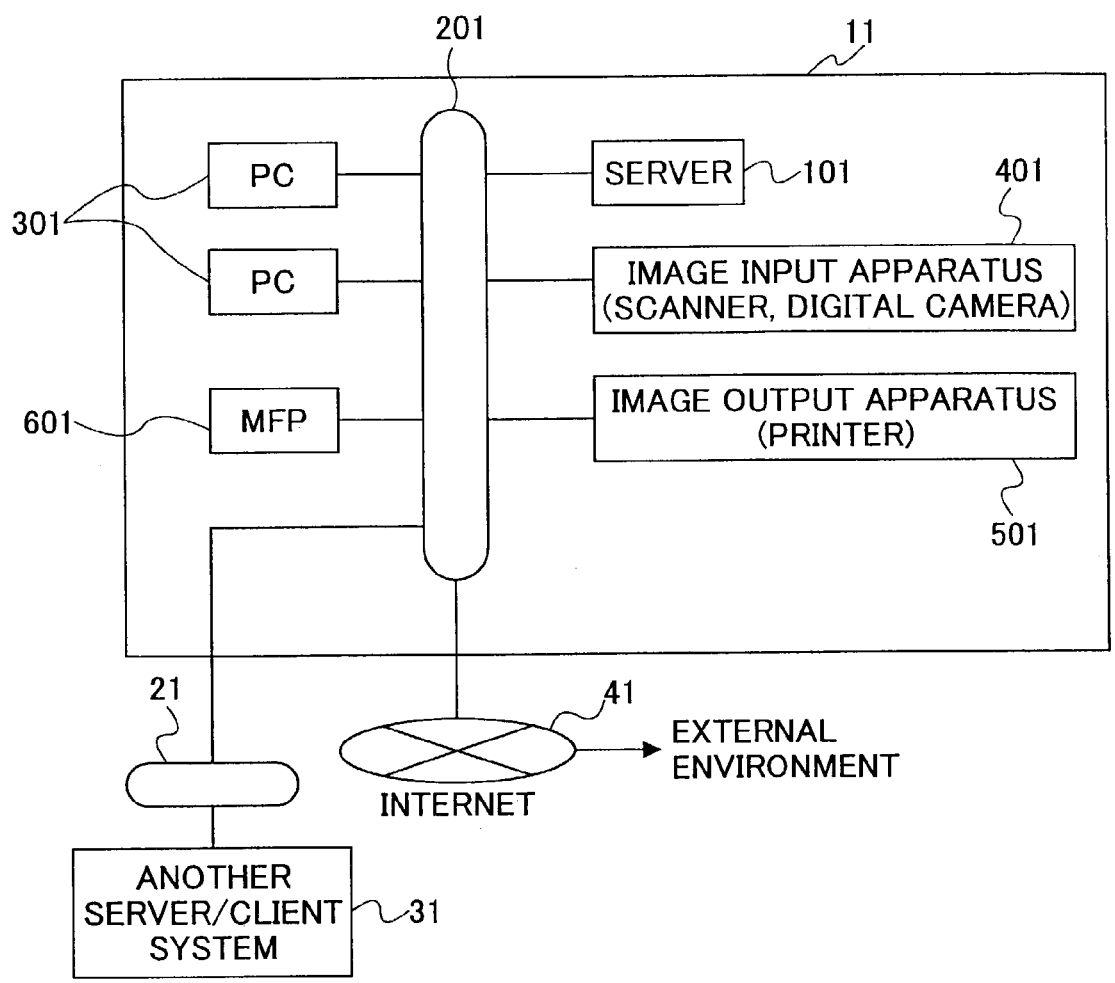
FIG. 1 is a block diagram showing an example of a system structure according to one embodiment of the present invention.

FIG. 1 is a block diagram showing an example of system structure according to one embodiment of the present invention.

In a system according to this embodiment, a server/client system 11 in which a plurality of personal computers 301 forming image processing apparatuses are connected to a server computer 101 via a network 201 such as a LAN is assumed. In the server/client system 11, an environment in which image input apparatus 401 such as a scanner and a digital camera, and an image output apparatus 501 such as a printer can be shared on the network 201 is set. Additionally, the environment may be constructed such that an MFP 601 called a multi-function peripheral is connected to the network 201, and the MFP 601 functions as the image input apparatus 401 and the image output apparatus 501.

The server/client system 11 is constructed such that data communication with another server/client system 31 can be performed via an intranet 21 and with an external environment can be performed via an Internet communication network 41.

Figure 2:
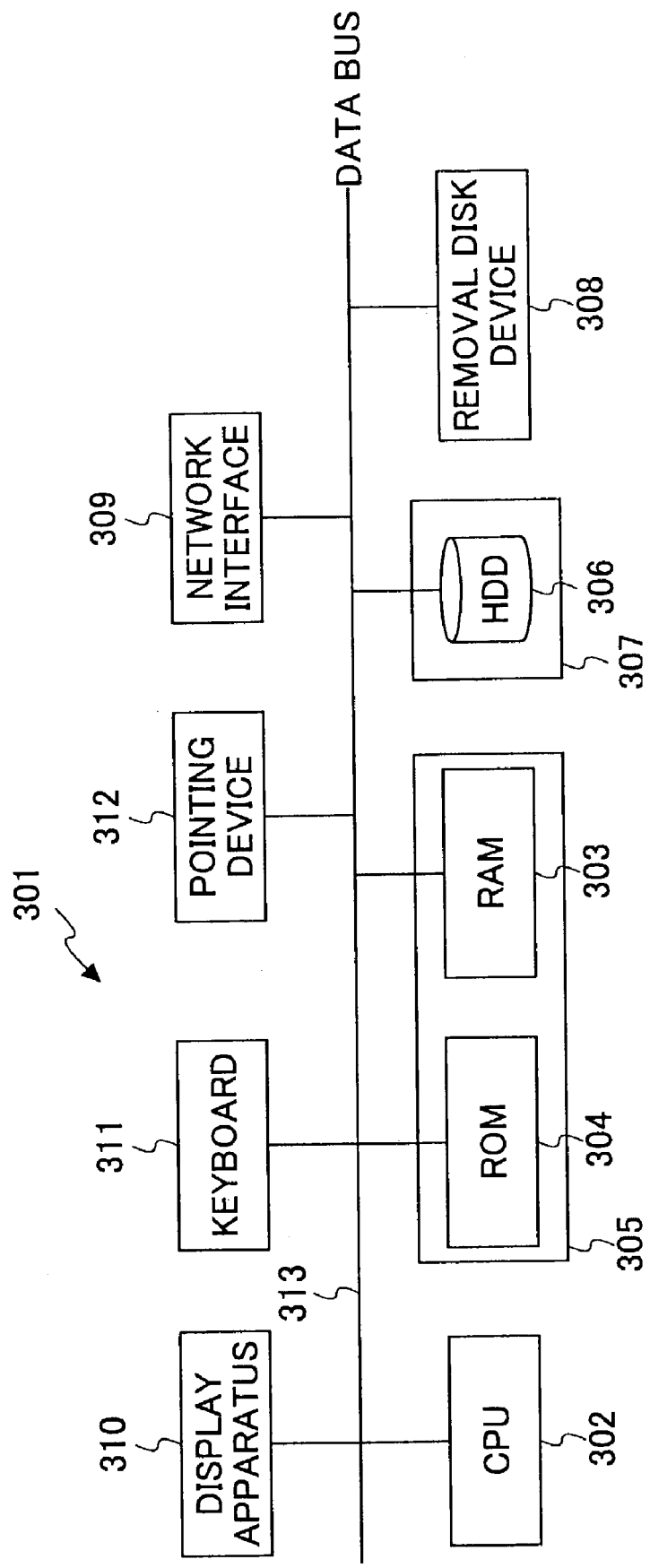
FIG. 2 is a block diagram showing a module structure of an image processing apparatus.

FIG. 2 is a block diagram of the personal computer 301 as the image processing apparatus according to this embodiment.

The personal computer 301 includes a CPU 302 performing information processing, a primary storage unit 305 such as a ROM 304 storing information and a RAM 303, a second storage unit 307 such as a HDD (hard disk drive) 306, a removable disk device 308 such as a CD-ROM for storing information, distributing information to the outside, and obtaining information from the outside, a network interface 309 for communicating information with another external computer, a display apparatus 310 displaying processes, results and the like to an operator, a keyboard 311 for the operator to input instructions, information and the like to the personal computer 301, a pointing device 312 such as a mouse, and the like. A bus controller 313 adjusts and operates data transmitted and received among the above-described parts.

In such personal computer 301, when a user turns the power ON, the CPU 302 starts up a program called loader in the ROM 304, reads a program called operating system managing hardware and software of the computer into the RAM 303, and boots the operating system. The operating system starts up a program and reads and saves information in accordance with operations of the user. Representative examples of the operating system are such as Windows (registered trademark) and UNIX (registered trademark). Operating programs that run on the operating systems are called application programs.

Here, the personal computer 301 stores an image processing program in the HDD 306 as the application program. In this sense, the HDD 306 functions as a storage medium storing the image processing program.

In addition, generally, the operating program installed in the second storage unit 307 such as the HDD 306 of the personal computer 301 is recorded on an optical information recording medium such as a CD-ROM and a magnetic medium such as an FD, and the recorded operating program is installed in the secondary storage unit 307 such as the HDD 306. Accordingly, a portable storage medium, the optical information recording medium such as a CD-ROM and the magnetic medium such as an FD, for example, may be the storage medium storing the image processing program. Further, the image processing program may be downloaded from the outside via the network interface 309, for example, and installed in the second storage unit 307 such as the HDD 306.

Figure 3:
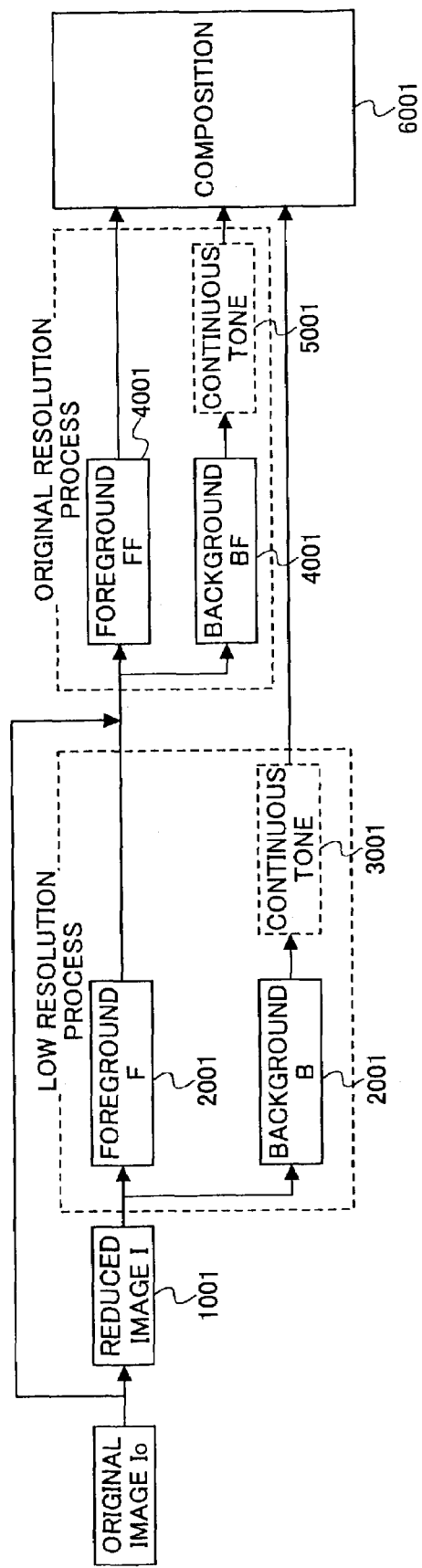
FIG. 3 is a block diagram generally showing processes carried out by an image processing program.
Figure 4:
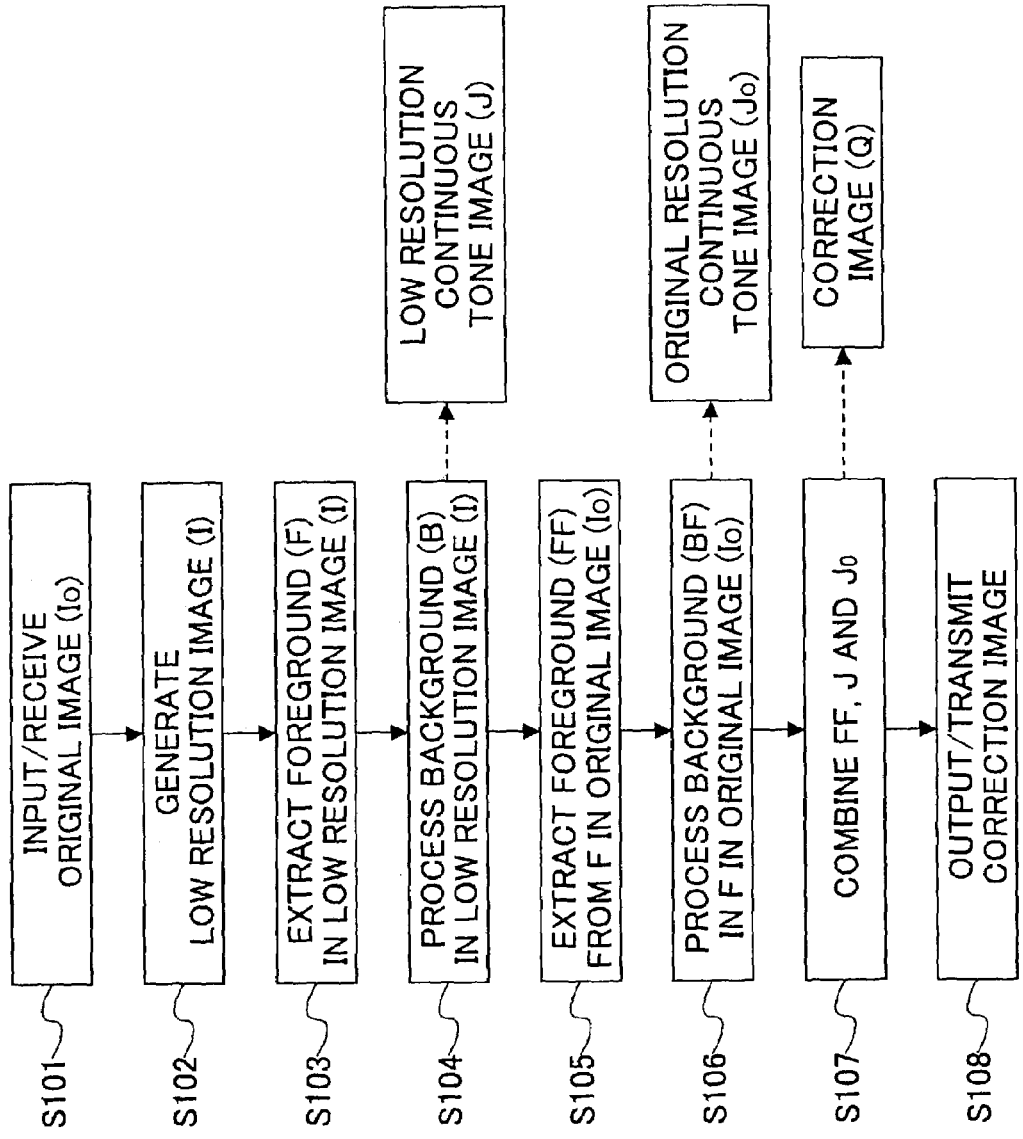
FIG. 4 is a flow chart showing the procedure of the various processes shown in FIG. 3.

FIG. 3 is a block diagram generally showing processes carried out in accordance with the image processing program by the personal computer 301 that is the image forming apparatus. In addition, FIG. 4 is a flow chart showing an execution procedure of the various processes included in the block diagram of FIG. 3.

In the personal computer 301, when the image processing program operating on the operating system is started up, the CPU 302 executes various processes and controls each part in a centralized manner according to the image processing program. On this occasion, the personal computer 301 carries out the various processes shown in the flow chart of FIG. 4 by the parts shown in the block diagram of FIG. 3. Next, a description will be given of the processes.

1. The Outline of the Processes

In this embodiment, multiple resolution analysis is used. According to the Mixed Raster Content (MRC) Imaging Model, an image is formed by the following two elements.

◎ Foreground: texts, graphics (line drawing, in particular), and important edges ◎ Background: an area other than the foreground (continuous tone area)

Among these elements, with respect to the background, there is no sharp edge. Thus, when an image is compressed to an image with a low resolution, approximately 100 dpi, for example, degradation is not conspicuous to the human eye. Additionally, the BTC (Block Truncation Coding) uses a lossy compression method in which an image is divided into blocks and each of the blocks is coded by two colors. On the other hand, with respect to the foreground, a high resolution is required for maintaining high frequency components. Thus, when expressing an image, it is necessary that the foreground and background be expressed by different methods from different perspectives.

Accordingly, in this embodiment, image processing is performed based on the perception that it is sufficient to perform the process of the background area with an image having a decreased resolution, thereby aiming for reducing the total processing time and the like.

As shown in the block diagram of FIG. 3 and the flow chart of FIG. 4, in the image processing according to this embodiment, it is assumed that the personal computer 301 receives an original image $I_O$ via the network interface 309, by way of example. This process corresponds to step S101 in the flow chart of FIG. 4. In this case, the original image $I_O$ is a digitized color image. On such an assumption, first, a reduced image I with a low resolution is generated from the original image $I_O$. This process corresponds to step S102 in the flow chart of FIG. 4.

Next, a foreground image F is extracted from the generated reduced image I with the low resolution based on local characteristics (edge, local statistic of a chrominance signal, and the like) as a low resolution process (refer to FIG. 3). This process corresponds to step S103 in the flow chart of FIG. 4. Pixels other than the foreground image F become a background image B. Then, the background image B is converted into a continuous tone expression (that will be described later), which becomes a background image J that is subjected to the continuous tone conversion. This process corresponds to step S104 in the flow chart of FIG. 4.

Then, with respect to the foreground image F extracted from the reduced image I with the low resolution as the foreground, a process is performed on the original image $I_O$ as is received as an original resolution process (refer to FIG. 3). A foreground image FF is extracted from the foreground image F, which is extracted as the foreground from the reduced image I, based on the local characteristics (edge, local statistic of a chrominance signal, and the like), and pixels other than the foreground image FF become a background image BF. This process corresponds to step S105 in the flow chart of FIG. 4. The background image BF is converted into the continuous tone expression (that will be described later), which becomes a background image $J_0$ that is subjected to the continuous tone conversion. This process corresponds to step S106 in the flow chart of FIG. 4.

Last, the background image J obtained from the reduced image I and expressed in a continuous tone, the foreground image FF, and the background image $J_0$ obtained from the original image $I_0$ and expressed in a continuous tone, are combined, thereby a correction image Q is obtained. This process corresponds to step S107 in the flow chart of FIG. 4. The correction image Q is output from the image output apparatuses 501 and 601 or sent to other apparatuses 301 and 31, for example. This process corresponds to step S108 in the flow chart of FIG. 4.

A description will be given of the outline of the process of converting the background images B and BF into the continuous tone expression.

With respect to the received original image $I_0$, when the method and parameters of a halftone process by which the dot pattern is generated are recognized, an appropriate filter may be applied to the original image $I_0$ for each pixel in accordance with the image characteristics thereof by preparing a set of linear filters having appropriate support sizes. In this embodiment, however, it is assumed that the appropriate support size is not recognized. Hence, the continuous tone conversion process is performed by using a multiple scale process from less dense to more dense as described below.

First, a local area R having the size of W×W (window sizes) is set in the image in the area remaining after the extraction of the foreground image F, that is, the background image B. Here, since the window size s is the size of W×W, the local area R is a square. However, the local area R is not necessarily limited to the square as long as the local area R is a rectangle. In addition, the local area R does not include a sharp edge, letter, graphic and the like when having an appropriate size. Thus, when the size of the window size s and the position of the local area R are appropriate, there must be no problem if the pixels in the local area R are replaced with the average color in the local area R. For example, as indicated by (a) in FIG. 5, in a case where the background of the local area R is formed by a single color, the result of the continuous tone conversion becomes as indicated by (c) in FIG. 5. That is, an appropriate continuous tone expression can be obtained.

On the other hand, in a case where the window size s is too large or the position of the local area R is not appropriate, the local area R assumes an inappropriate state and the result of the continuous conversion also becomes inappropriate. As an example in which the local area R assumes the inappropriate state when the window size s is too large or the position of the local area R is inappropriate, there is a state where a plurality of different colors are included in the background as indicated by (b) in FIG. 5 and (a) in FIG. 6. The result of performing the continuous tone conversion when the local area R is in the state as indicated by (b) in FIG. 5 and (a) in FIG. 6 is as indicated by (b) in FIG. 6. That is, distortion occurs in the image.

Therefore, in order to solve such a problem, it is necessary to detect a part where the distortion occurs, set again the local area R having a smaller window size s to the part, and perform the continuous tone conversion process again on the local area R.

A description will be given of a detection method of the part where the distortion occurs. The edges included in the background images J and $J_0$ that are expressed in the continuous tones should be a subclass of the edges of the original image $I_0$. In other words, as long as the appropriate process is performed, it is impossible for edges that do not exist in the original image $I_0$ to exist in the background images J and $J_0$ that are expressed in the continuous tones. When observed pixel by pixel, it is impossible that the edge magnitude in the background images J and $J_0$ that are expressed in the continuous tones is higher than that in the original image $I_0$. On the other hand, as indicated by (c) in FIG. 6, in the background images J and $J_0$ that are expressed in the continuous tones, when there are edges that do not exist in the original image $I_0$, this is considered to be the side effect caused when the window size s is too large or the position of the local area R is not appropriate. That is, it is possible to detect the part where the distortion occurs by determining whether or not the background images J and $J_0$ that are expressed in the continuous tones include edges that do not exist in the original image $I_0$.

Accordingly, the local area R having a smaller window size s is set again to the detected part where distortion occurs, and the continuous tone conversion process is performed again on the local area R. On this occasion, it is desirable that an appropriate processing scale be properly determined for each pixel. It is difficult, however, to automatically determine the appropriate processing scale by bottom-up image analysis. Consequently, the appropriate processing scale is determined by the multiple scale process from more dense to less dense while comparing a created image with the original image based on edge information.

However, actually, it is impossible to cover all the background images B and BF with the rectangular local area R having the constant window size s. Accordingly, as described later, in actual algorithm, the continuous tone conversion is performed by using matrix-like runs.

2. The Details of the Process (1001: a Reduced Image Generation Process)

This is a process of generating the reduced image I having a lower resolution than the original image $I_0$ with respect to the original image $I_0$ that is a digital color image.

Here, simply, an input image is divided into blocks that are not overlapping with each other, the average value of signals in the block is set to the signal of the corresponding pixels in a low resolution image, and thereby the reduced image I is generated. Then, $$I[i, j; k] = \sum_{m=ri}^{r(i+1)-1} \sum_{n=rj}^{r(j+1)-1} I_0[m, n; k]/(r \times r)(k = R, G, B)$$

where the size of the block, that is, a reduction ratio, is r. The reduction ratio r is always a natural number.

(2001: a First Extraction Process)

A process of distinctly extracting the foreground image F and the background image B from the reduced image I.

Prior to this process, for eliminating noise, the reduced image I with the low resolution is smoothed with a linear filter, for example. On this occasion, when all pixels are not set to a foreground element as an initial state, then

[i, j]∈B for all i, j.

Thus, the foreground image F that is a foreground element is extracted from the smoothed reduced image I with the low resolution. A detection process of edge magnitude and a process of local statistic of color signal are used in this extraction process. In the following, a description will be given of these two processes.

First, a description will be given of edge magnitude calculation and the foreground extraction. The edge magnitude ($E_0$) is calculated with respect to the reduced image I with the low resolution. The edge magnitude of a pixel(i, j) is the maximum value of the edge magnitudes calculated respectively for three channels (RGB). That is, $E_0[i, j] = \max\{S[I;i,j;R], S[I;i,j;G], S[I;i,j;B]\}$.

It should be noted that S[I; i, j; k] is the edge magnitude of the pixel (i, j) of a k channel in the reduced image I. By performing a threshold value process (thr) on the edge magnitude calculated as described above, the foreground element is obtained as follows.

[i, j]∈F if $E_0$[i, j]>thr

In addition, it should be noted that a predetermined fixed value may be set to the threshold value, and the setting may be changed externally.

Next, a description will be given of the local statistic calculation and the foreground extraction. In this process, by performing local adaptive binarization of color components on pixels that are not extracted as the foreground in the extraction process of the edge characteristics by the edge magnitude calculation, the remaining foreground element is detected. For example, windows having a fixed size are set around each pixel. An average value μ and a standard deviation σ of the pixel in the window is calculated for each of the RGB channels, comparison between a threshold value μ (a+b σ) having a and b as parameters and a signal value. Then, when there is a channel having a signal value lower than the threshold value, the pixel (i, j) is set to the foreground element. That is, as follows.

[i, j]∈F if $I[i, j; R] < (a_R + b_R \cdot \sigma_R)\mu_R$ or $I[i, j; G] < (a_G + b_G \cdot \sigma_G)\mu_G$ or $I[i, j; B] < (a_B + b_B \cdot \sigma_B)\mu B$ In this way, the foreground image F that is the foreground element is extracted through the two kinds of processes, the detection process of the edge magnification and the process of local statistic of color signals.

When distinctly extracting the foreground image F and the background image B, it is possible to combine the extraction of edges and the extraction of letters and line drawings by the binarization of color components. For example, with respect to the reduced image I, both the extraction of edges and the extraction of letters and line drawings by the binarization of color components, only the extraction of edges, or only the extraction of letters and line drawings by the binarization of color components may be performed. However, when only the extraction of edges is performed, there is a case where an image such as a thin line cannot be extracted. Accordingly, it is preferable that the extraction of edges be used in combination with the binarization of color components. In addition, the extraction of edges and the binarization of color components may be performed in either order. Further, the binarization of color components is not limited to the above-described local adaptive binarization, and binarization using a fixed threshold value may also be performed.

(3001: a First Continuous Conversion Process)

A process of generating the background image J that is subjected to the continuous tone process by converting the halftone dot pattern of the image extracted from the reduced image I as the background image B into a continuous tone. This is the process that is generally explained as the multiple scale process from more dense to less dense, and more specifically, is formed by a generation process of an initial continuous tone image and a modification process of a tone image. Therefore, a description will be given of these two processes, that is, the generation process of the initial continuous tone image and the modification process of the tone image, in this order.

First, a description will be given of the outline of the generation process of the initial continuous tone image.

Figure 7A:
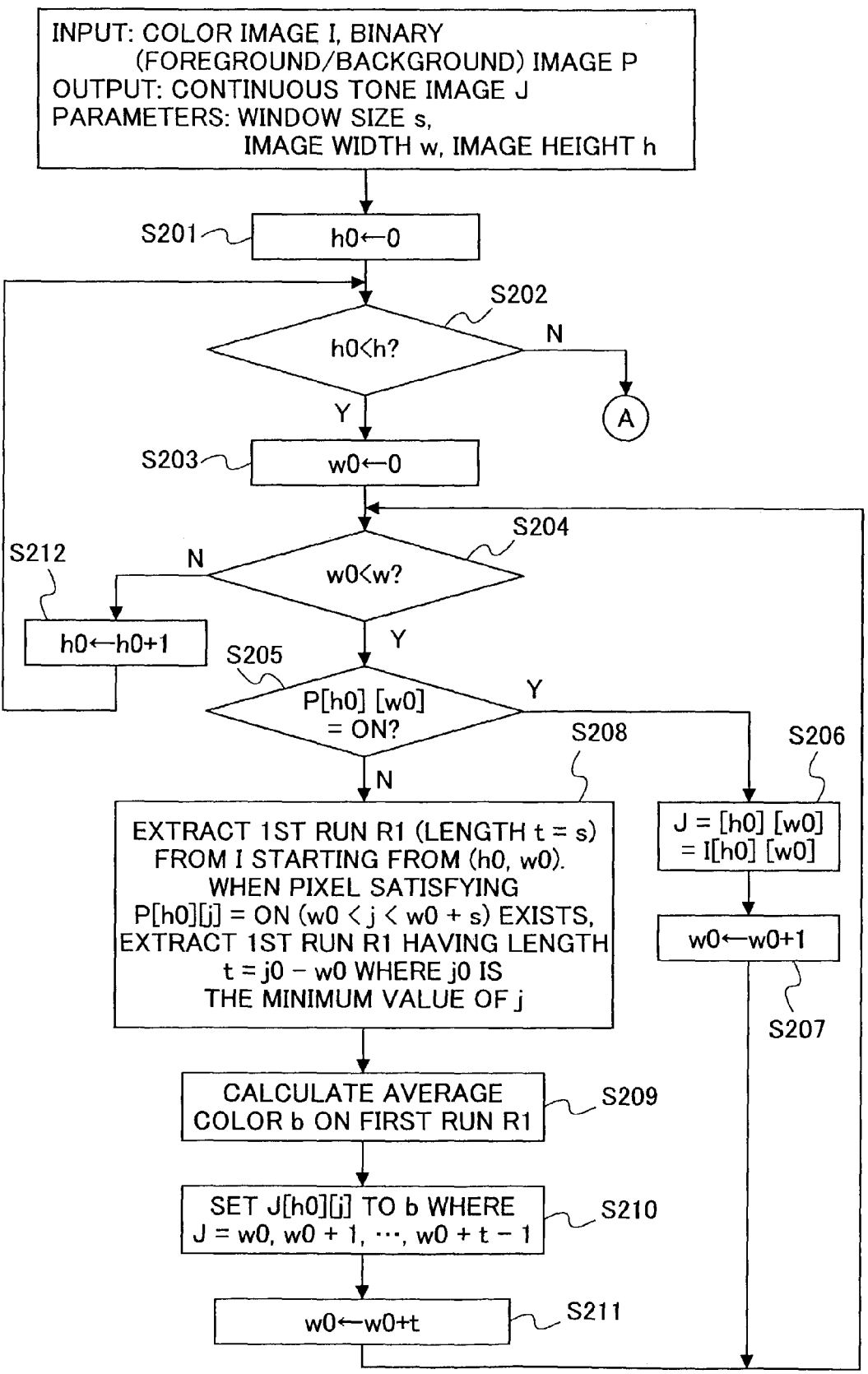
FIGS. 7A and 7B are a flow chart showing the flow of a continuous tone process.
Figure 7B:
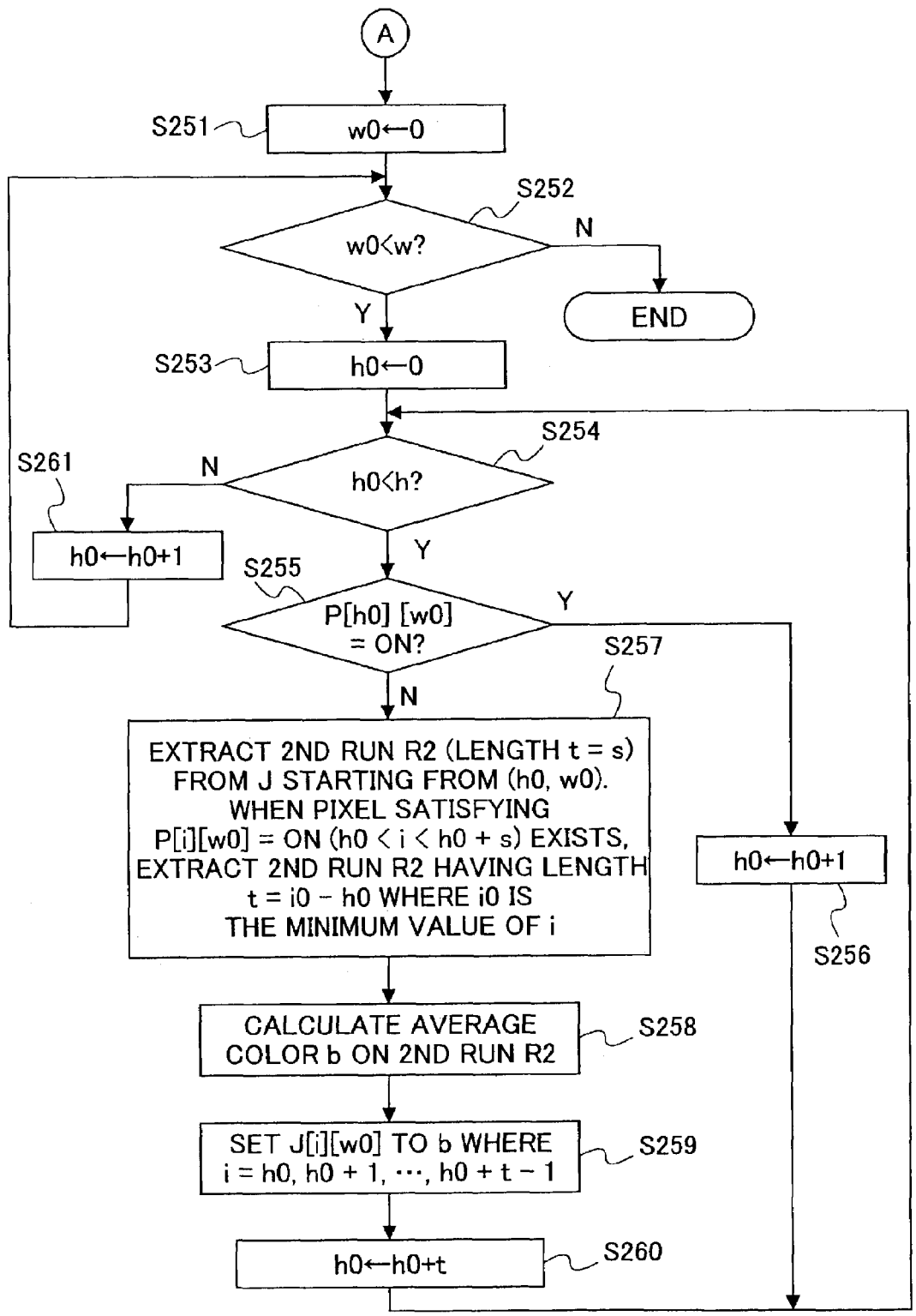

FIGS. 7A and 7B are a flow chart showing the flow of the generation process of the initial continuous tone image. In the flow chart, it is assumed that the initial continuous tone image is generated. Here, a binary image P having the same size as the reduced image I, and having a value ON in the foreground element (element of the foreground image F) and a value OFF in the other (element of the background image B) is formed. The meaning of the symbols in the flow chart of FIGS. 7A and 7B are as follows.

input information

I: reduced image

P: binary (foreground/background) image output information

J: background image after continuous tone conversion process parameters s: window size w: image width h: image height The generation process of the initial continuous tone image includes a window setting process (corresponding to step S301 of FIG. 10 which will be described later) and a conversion process. The window setting process sets a window of a predetermined size to the image extracted as the background image B. The conversion process replaces the average value of color in each window as the pixels in each window, thereby converting the halftone dot pattern into a continuous tone. By performing such continuous tone conversion process, it is possible to improve the result of an image improvement process that improves granularity and moiré phenomena of an output image irrespective of image improvement information included in the original image $I_0$.

Additionally, in the conversion process, a run that subdivides a line along a first direction in the window, the lateral direction, for example, is set so as to obtain the average value of color for each run (corresponding to step S302 in FIG. 10 which will be described later). Then, a run that subdivides a line along a second direction orthogonal to the first direction in the window, a vertical direction, for example, is set so as to obtain the average value of color for each run (refer to step S303 in FIG. 10, which will be described later). Thus, since the average value of color in the window is obtained based on the average value of color of each run that subdivides lines in the lateral and vertical directions, for example, it is possible to obtain the average value of color in the window with good accuracy.

Figure 8A:
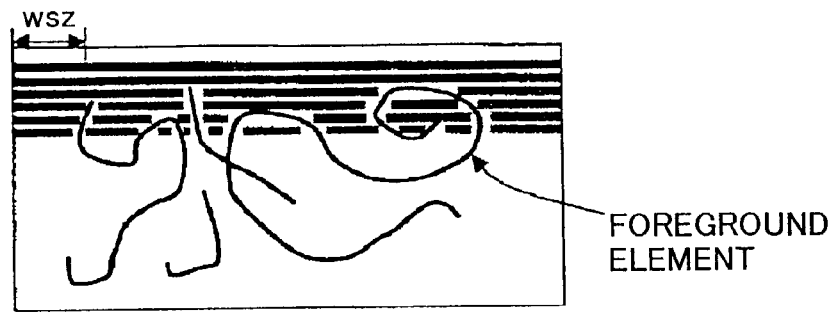
FIG. 8A is a schematic diagram showing a continuous tone conversion process.

A more specific description will be given of the process. As shown in FIG. 8A, a run having the maximum length of wsz (for example, 4 pixels in 100 dpi) and not including a pixel (a pixel in which P is ON) in the foreground element is sequentially formed for each line in the lateral direction. This process corresponds to steps S201 through S208 and step S210 through S212 of the flow chart in FIGS. 7A and 7B.

More specifically, in step S201, an ordinate h0 is initialized to 0. Then, in step S201, whether or not the ordinate h0 is smaller than the image height h is determined. When the decision result in step S202 is YES, the process proceeds to step S203. In step S203, an abscissa w0 is initialized to 0. Then, in step S204, whether or not the abscissa w0 is smaller than the image width w is determined. When the decision result in step S204 is NO, the ordinate h0 is incremented by 1 in step S212, and the process returns to step S202. On the other hand, when the decision result in step S204 is YES, the process proceeds to step S205. In step S205, it is determined whether or not P[h0][w0] is ON. When the decision result in step S205 is NO, the process proceeds to step S208. In step S208, a first run R1 having the length t=s in the horizontal direction is extracted from the reduced image (color image) I with the coordinates (h0, w0) as the starting point. Here, however, when there is a pixel satisfying P[h0][j]=ON (w0<j<w0+s), the first run R1 having the length t=j0−w0 is extracted where j0 is the minimum value of j in such a pixel. Thereafter, an average color b on the first run R1 is calculated in step S209. In step S210, J[h0][j] is set to b where J=w0, w0+1, . . . ,w0+t−1. Then, the abscissa w0 is incremented by t in step S211, and the process returns to step S204.

On the other hand, when the decision result in step S205 is YES, J[h0][w0] is considered to be I[h0][w0]. Then, w0 is incremented by 1, and the process returns to step S204.

Then, the average color of the pixels constituting the run is calculated for each run, and the average color after the calculation is set to the color of each of the pixels constituting the run. This process corresponds to step S209 of the flow chart in FIGS. 7A and 7B. In this manner, an image C' on which the continuous tone conversion process using the run in the lateral direction is obtained.

Figure 8B:
FIG. 8B is another schematic diagram showing the continuous tone conversion process.

Thereafter, as shown in FIG. 8B, runs in the vertical direction are formed and the continuous tone conversion process similar to that above is performed on the generated image C'. This process corresponds to steps S251 through S261.

More specifically, when the decision result in step S202 is NO, the process proceeds to step S251 as indicated by the circled A in FIGS. 7A and 7B. In step S251, the abscissa w0 is initialized to 0. Then, in step S252, whether or not w0 is smaller than the image height w is determined. When the decision result in step S252 is NO, the process ends. On the other hand, when the decision result in step S252 is YES, the ordinate h0 is initialized to 0 in step S253. In step S254, whether or not the ordinate h0 is smaller than the image height h is determined. When the decision result in step S254 is NO, the ordinate h0 is incremented by 1 in step S251, and the process returns to step S252.

On the other hand, when the decision result in step S254 is YES, in step S255, it is determined whether or not P[h0][w0] is ON. When the decision result in step S255 is YES, the ordinate h0 is incremented by 1, and the process returns to step S254. When the decision result in step S255 is NO, the process proceeds to step S257. In step S257, a second run R2 having the length t=s in the vertical direction is extracted from the continuous tone image J with the coordinates (h0, w0) as the starting point. Here, however, when there is a pixel satisfying P[i][w0]=ON (h0<i<h0+s), the second run R2 having the length t=i0−h0 is extracted where i0 is the minimum value of i in such a pixel. Thereafter, the average value b on the second run R2 is calculated in step S258. In step S259, J[i][w0] is set to b where i=h0, h0+1, . . . , h0+t−1. In step S260, the ordinate h0 is incremented by the length t, and the process returns to step S254.

Figure 9:
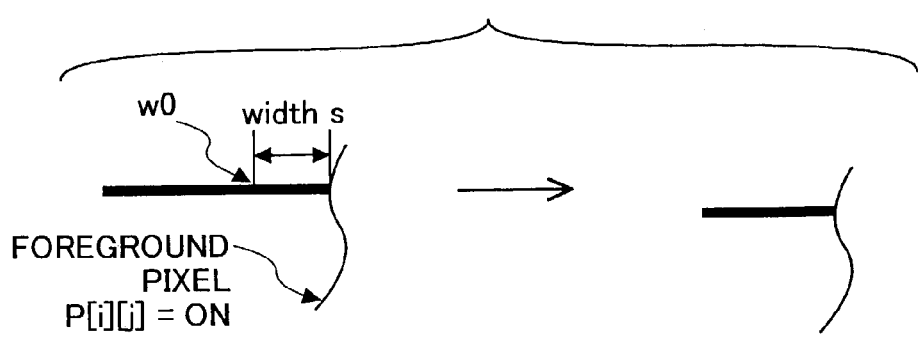
FIG. 9 is a schematic diagram showing a process of extending a run.

In this way, in the continuous tone conversion process, the runs are sequentially formed from left to right in the lateral direction and from up to down in the vertical direction until the run becomes the designated length or meets the foreground element. When the run meets the foreground element, there are cases where the length of the run is shorter than the designated length. Thus, there are cases where a background color estimated on the run is dark. In order to solve this problem, when the run meets the foreground element and the length (width s) of which run does not grow to the designated length, as shown in FIG. 9, a process of extending the run by turning back from the starting point (w0) of the run is performed. In other words, when the run meets the foreground element and the length (swidth) of the run is less than wsz, the run is extended by turning back from the starting point (w0) of the run.

As described above, by performing the continuous tone conversion process on the runs in the lateral and vertical directions, the initial continuous tone image J is generated.

Next, a description will be given of the outline of the modification process of the continuous tone image, with reference to the flow chart in FIG. 10. FIG. 10 is the flow chart showing the flow of the modification process of the continuous tone image.

Figure 10:
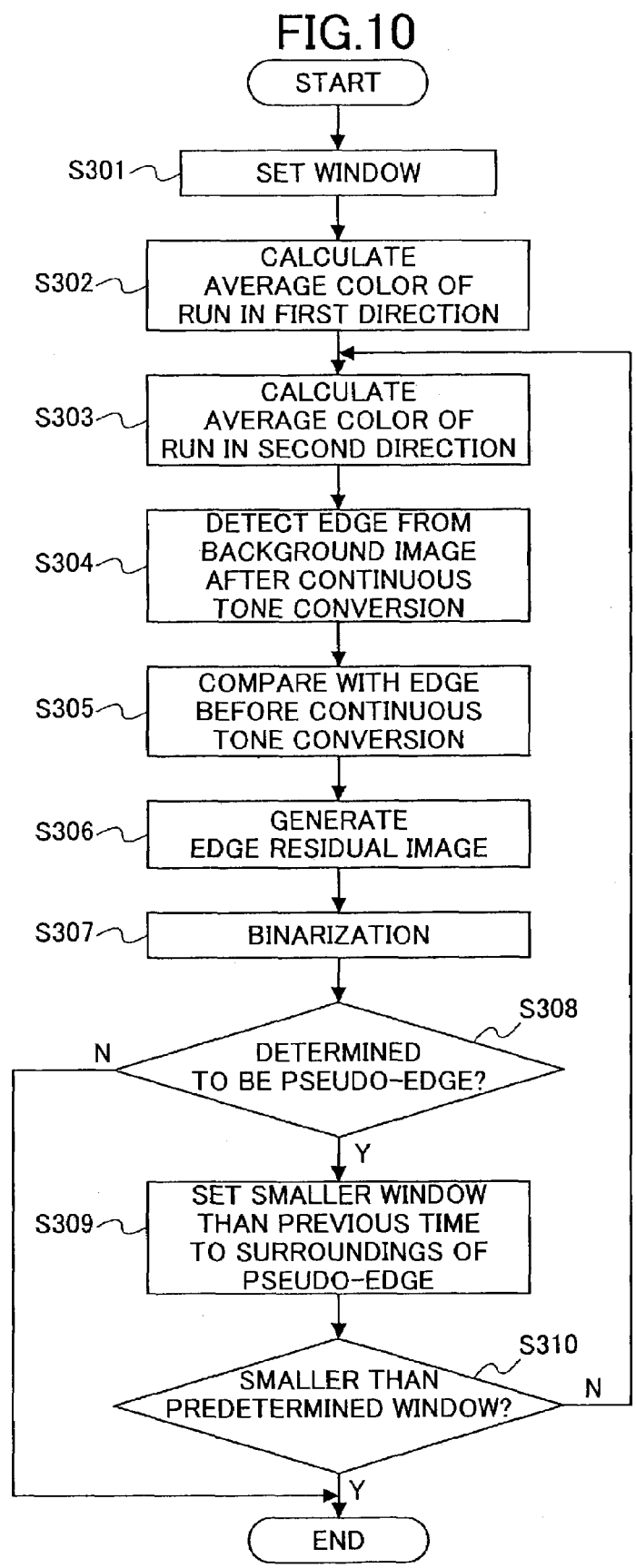
FIG. 10 is a flow chart showing the flow of a correction process of a continuous tone image.

As previously described, in the generation process of the initial continuous tone image, the window of the predetermined size is set to the image extracted as the background image B (this process corresponds to step S301 of the flow chart in FIG. 10). Then, the average value of color in each window is replaced as the pixels in the window, thereby the halftone dot pattern is converted into a continuous tone. On this occasion, as described above, the average value of color in each window is obtained such that the run that subdivides the lines along the first direction in the window, the lateral direction, for example, is set so as to obtain the average value of color for each run (step S302), and subsequently, the run that subdivides the lines along the second direction orthogonal to the first direction in the window is set so as to obtain the average value of color for each run (step S303), and thereby the average value of color in the window is obtained.

However, in the process of setting the window for an image and replacing the average value of color in the window as the pixels of the window, there is a possibility that the average value of color in a window and that in the adjacent window are far different, and thus an edge that does not exist in the original image before the continuous tone conversion process is performed is generated in the image (initial continuous tone image J) on which the continuous tone conversion process is performed.

Therefore, the continuous tone conversion process according to this embodiment includes an edge detection process, a comparison and determination process, and a re-conversion process. The edge detection process detects an edge from the image (initial continuous tone image J) on which the continuous tone conversion process converting the halftone dot pattern of the image extracted as the background image B into the continuous tone is performed. The comparison and determination process compares a detected edge with the edge in the original image before the performance of the continuous tone conversion process thereon, and determines whether or not the detected edge is an edge existing in the original image $I_0$ before the performance of the continuous tone conversion process thereon. The re-conversion process performs the continuous tone conversion process again on the surroundings of the detected edge when it is determined that an edge not existing in the original image $I_0$ before the performance of the continuous tone conversion process thereon is detected as a result of the comparison and determination.

That is, in the flow chart shown in FIG. 10, the average value of color is obtained for the run in the second direction orthogonal to the first direction in the window in step S303, and in step S304, an edge is detected from the image (initial continuous tone image J) on which the continuous tone conversion process is performed. In step S305, the detected edge is compared with the edge in the original image $I_0$ before the performance of the continuous tone conversion process thereon. Thereby, an edge residual image is generated in step S306, and is binarized in step S307. In step S308, based on the binarized edge residual image, it is determined whether or not the detected edge is a pseudo-edge, that is, an edge not existing in the original image $I_0$ before the performance of the continuous tone conversion process thereon. Then, when it is not determined that there is the pseudo-edge (NO in step S308), the process ends. When it is determined that there is the pseudo-edge (YES in step S308), a window smaller than the previous one is set for the surroundings of the pseudo-edge in step S309. In step S310, it is determined whether or not the window size is smaller than a predetermined window size. If the decision result in step S310 is NO, then the process returns to step S302. The processes of steps S302 through S309, that is, the processes starting from the process of calculating the average colors with respect to the first and second directions in the window (steps S302 and S303), are repeated until the window size becomes smaller than the predetermined window size (YES in step S310).

Hence, in a case where an edge not existing in the original image $I_0$ before the performance of the continuous tone conversion process thereon is found (detected) in the image (initial continuous tone image J) on which the continuous tone conversion process is performed, by performing the continuous tone conversion process again on the surroundings of the detected edge, it is possible to approximate the image on which the continuous tone conversion process is performed (image after the modification) to the original image $I_0$ before the performance of the continuous tone conversion process.

The comparison and determination process deducts the edge magnification of the original image $I_0$ before the performance of the continuous tone conversion process thereon from the calculated edge magnification for each pixel, and determines that the edge does not exist in the original image $I_0$ before the performance of the continuous tone conversion process thereon when the value obtained by the reduction is equal to or more than a predetermined threshold value. By using such a determination method, it is easily determined whether or not an edge not existing in the original image $I_0$ before the performance of the continuous tone conversion process thereon exists in the image (initial continuous tone image J) on which the continuous tone conversion process is performed.

Further, the window of the image on which the continuous tone conversion process is performed in the re-conversion process is set smaller than the window that is initially set. Hence, when performing the continuous tone conversion process again, it is possible to make the average value of a window and that of the adjacent window close. Accordingly, since continuity of pixels defined as the average values of the windows is maintained, it is possible to perform image reproduction with a good image quality.

A more specific description will now be given of the process of modifying the initial continuous tone image J. First, for the outline, (a) The edge residual image is generated by deducting the edge magnification $E_0$ of the original image $I_0$ from the edge magnification of the initial tone image J for each pixel. In nearly all pixels, the residuals are values equal to or less than 0.Then, the binarization process is performed on the edge residual image so as to generate the pseudo-edge image $E_1$. The pixels having the residual equal to or more than the threshold value are set ON, and the others are set OFF. Here, the size of the window is set smaller than the size set in the previous time.

(b) Then, the value of the length wsz of the run in the set window is reduced to half. The continuous tone conversion process is performed on the surroundings of the ON pixels in the pseudo-edge $E_1$ by using the new value of wsz so as to generate the continuous tone image C. Here, an example of reducing the value of the length wsz of the run to half is shown. However, it is not necessarily limited to reducing the length to half as long as the length wsz of the run is shortened.

(c) In the background color image J, the colors of (2·wsz−1)×(2·wsz−1) pixels, for example, in the vicinity of the ON pixels in the pseudo-edge image $E_1$ are replaced with colors in the new continuous tone image C.

(d) The processes of the above (a) through (c) are recursively repeated until wsz becomes smaller than a predetermined minimum size.

Next, a detailed description will be given of the above (a) through (d).

In order to detect edge of the continuous tone image, the edge magnification ($E_1$) is calculated from the continuous tone image J by the following equation in a manner similar to the above.

$E_1[i, j]=\max \{S[J; i, j; R], S[J; i, j; G], S[j; i, j; B]\}$

In order to detect the pseudo-edge, a false edge existing not in the reduced image I with the low resolution but only in the continuous tone image J is obtained by the following equation.

$$E_1[i, j] = \begin{cases} ON & \text{if } E_1[i,j] > \max\{E_0[r,c]: |r-1| \leq 1, |c-1| \leq 1\} \\ OFF & \text{otherwise} \end{cases}$$

In order to modify the background color, the window size (wsz) is reduced (to half). The continuous tone conversion (C) is performed with the new small window size (wsz). Then, in the continuous tone image J, the surroundings of the pseudo-edge are replaced with the converted color C.

J[i, j; k] B[i, j; k]

if there is a pixel(r, c) such that $E_1$[r, c]

=ON and |r−1|≦wsz, |c−j|≦wsz

Thereafter, for repeating the modification process, a series of the processes of the continuous tone image correction are repeated while the window size (wsz) is greater that the designated minimum size. Otherwise, the continuous tone image modification ends.

(4001: a Second Extraction Process)

This is a process of distinctly extracting the foreground image FF and the background image BF from the original image corresponding to the image extracted from the reduced image I as the foreground image F.

That is, a fine process with the original resolution is performed on the foreground image F extracted from the reduced image I with the low resolution as the foreground. To be more accurate, an area of the original image $I_0$ corresponding to the foreground image F is a set of pixels (i, j) satisfying [i/r, j/r]∈F. Thus, in this foreground image F, foreground extraction is performed in a manner similar to the technique described above with respect to the original image $I_0$. Consequently, an area categorized as the foreground is taken as FF, and the background image, which is the remaining area, is taken as BF (=F−FF).

Regarding the foreground extraction, as in the first extraction process 2001, it impossible to combine the extraction of edges and the extraction of letters and line drawings by the binarization of color components. For example, both the extraction of edges and the extraction of letters and line drawings by the binarization of color components, only the extraction of edges, or the extraction of letters and line drawings by the binarization of color components may be performed on the reduced image I.

In addition, it is possible to combine the extraction of edges and the extraction of letters and line drawings by the binarization of color components in various ways with respect to the distinct extraction of the foreground image F and the background image B in the first extraction process 2001 and the distinct extraction of the foreground image FF and the background image BF in the second extraction process 4001.

For example, three kinds of combinations are possible. That is, the distinct extraction of the foreground image F and the background image B in the first extracting process 2001 may be performed by both the extraction of edges and the extraction of letters and line drawings by the binarization of color components, and the distinct extraction of the foreground image FF and the background image BF in the second extraction process 4001 may be performed by both the extraction of edges and the extraction of letters and line drawings by the binarization of color components, only by the extraction of edges, or by the extraction of letters and line drawings by the binarization of color components.

For another example, three kinds of combinations are possible. That is, the distinct extraction of the foreground image F and the background image B in the first extraction process 2001 may be performed only by the extraction of edges, and the distinct extraction of the foreground image FF and the background image BF in the second extraction process 4001 may be performed by both the extraction of edges and the extraction of letters and line drawings by the binarization of color components, only by the extraction of edges, or by the extraction of letters and line drawings by the binarization of color components.

For yet another example, three kinds of combinations are possible. That is, the distinct extraction of the foreground image F and the background image B in the first extraction process 2001 may be performed only by the extraction of letters and line drawings by the binarization of color components, and the distinct extraction of the foreground image FF and the background image BF in the second extraction process 4001 may be performed by both the extraction of edges and the extraction of letters and line drawings by the binarization of color components, only by the extraction of edges, or by the extraction of letters and line drawings by the binarization of color components.

(5001: a Second Continuous Tone Conversion Process)

This is a process of converting the halftone dot pattern of the image extracted from the original image $I_0$ as the background image BF into a continuous tone so as to generate the background image $J_0$ on which the continuous tone process is performed.

In other words, in the background image BF extracted from the original image $I_0$, the continuous tone conversion process is performed by a method similar to the above-described method for the original image $I_0$ and the continuous tone image $J_0$ is calculated. Here, the initial length of the run is set to d r ("d" is a constant number). "r" corresponds to one pixel of the reduced image I with the low resolution, and the physical length is approximately constant irrespective of the resolution of an input image. The constant number "d" is set such that the length of the run is sufficiently greater than the cycle of the halftone dot pattern.

(6001: a Combining Process)

This is a process of combining the image J converted into the continuous tone in the first continuous tone conversion process, the image extracted in the second extraction process as the foreground image FF, and the image $J_0$ converted into the continuous tone in the second continuous tone conversion process.

Hence, the correction image Q is obtained. Actually, in a pixel [i, j], the correction image Q is expressed as follows.

if [i/r, j/r]∈B, then Q[i, j; k]=J[i/r, j/r; k] (k=R, G, B)

if [i/r, j/r]∈F, [i, j]∈FF; then Q[i, j; k]=io[i, j; k] (k=R, G, B)

if [i/r, j/r]∈F, [i, j]∈BF, then Q[i, j; k]=$J_0$[i, j; k] (k=R, G, B)

As described above, the personal computer 301 carries out the above-mentioned various processes according to the installed image processing program, for example. That is, the process of distinctly extracting the foreground image F and the background image B is performed on the reduced image I (process 2001), and the process of distinctly extracting the foreground image FF and the background image BF from the original image $I_0$ is further performed on the image extracted as the foreground image F in the process 2001 (process 4001). Then, the process of converting the halftone dot pattern into a continuous tone is performed on the image extracted from the reduced image I as the foreground image F and the image extracted from the original image $I_0$ as the background image BF (processes 3001 and 5001). Thereafter, the images converted into the continuous tones and the image extracted from the original image $I_0$ as the foreground image FF are combined. Accordingly, this embodiment of the present invention includes the following advantages.

(1) The greater part of the background image of the image obtained after the combination of the images of which halftone dot patterns are converted into continuous tones is the background image B that is extracted from the reduced image I. Hence, in a case where the functions for improving the granularity and moiré phenomena of the output image are realized by software, it is possible to achieve a practical processing speed.

(2) The greater part of the background image of the image obtained after the combination of the images of which halftone dot patterns are converted into the continuous tones is the image extracted from the reduced image I. Thus, traces of various image processing included in the original image $I_0$ become inconspicuous. Hence, even in a case where an image that is input by the image input apparatus 401 or 601 operated on the sender's side of the image and includes correction information depending on the characteristics of the image input apparatus 401 or 601 is subjected to a reproduction process by the image output apparatus 501 operated on the recipient's side of the image, and having the characteristics different from those of the image input apparatus 401 or 601, or a case where the reproduction process is performed on an image that is obtained from the external environment using the Internet communication network 41 and includes unknown correction information, it is possible to easily apply the image quality improving process that improves the granularity and moiré phenomena of the output image. Accordingly, it is possible to obtain satisfactory image quality.

(3) The greater part of the background image of the image obtained after the combination of the images of which halftone dot patterns are converted into the continuous tones is the image extracted from the reduced image I. Thus, traces of various image processing included in the original image $I_0$ become inconspicuous. Hence, irrespective of the processing method used in the halftone processing method of the image input by the image input apparatus 401 or 601 operated by the sender's side of the image, without depending on the processing method, it is possible to realize, by the image output apparatus 501 operated on the recipient's side of the image, image reproduction with a good image quality where the granularity and moiré phenomena of the output image are improved.

Further, in this embodiment, an example is shown where the digital color image is used as the original image $I_0$, and the processes are performed on the digital color image. However, the present invention may be applied similarly to a digital image formed by one channel such as a monochrome image.

Additionally, in this embodiment, the function of the second extraction process 4001, that is, the function of distinctly extracting the foreground image FF and the background image BF from the original image corresponding to the image extracted from the reduced image I as the foreground image F is performed. Then, the function of the second continuous tone conversion process 5001, that is, the function of converting the halftone dot pattern of the image extracted from the original image $I_0$ as the background image BF into a continuous tone so as to generate the background image $J_0$ on which the continuous tone process is performed. Such functions of the second extracting process 4001 and second continuous tone conversion process 5001 are functions of further distinctly extracting the foreground image FF and the background image BF from the original image I0 with respect to the image extracted from the reduced image I as the foreground image FF. The performance of the functions is effective for differentiating the foreground image F (FF) and the background image B (BF) more precisely. However, it is not always necessary to perform the functions of the second extraction process 4001 and the continuous tone conversion process 5001 to obtain the effects of the above-mentioned (1), (2) and (3). Accordingly, upon implementation, the process may be such that the functions of the reduced image generation process 1001, the first extraction process 2001, the first continuous tone conversion process 3001, and the combining process 6001 are performed on the original image $I_0$ that is a digital image. In this case, in the combining process 6001, the image extracted as the foreground image F in the first extraction process 2001 and the image J converted into a continuous tone in the first continuous tone conversion process 3001 are combined. Alternatively, for the image to be combined, instead of using the image extracted as the foreground image F in the first extraction process 2001, the image of the area in the original image $I_0$ corresponding to the image extracted as the foreground image F in the first extraction process 2001 may be used. As mentioned above, such a corresponding image in the original image $I_0$ is a set of pixels [i, j] satisfying $[i/r, j/r] \in F$.

The present invention is not limited to the specifically disclosed embodiments, and variations and modifications may be made without departing from the scope of the present invention.

The present application is based on Japanese priority application No. 2002-081361 filed on Mar. 22, 2002, the entire contents of which are hereby incorporated by reference.

What is claimed is:

1. An image processing apparatus, comprising:
   a reduced image generating part generating a reduced image having a lower resolution than that of an original image, the original image being a digital image;
   a first extracting part distinctly extracting a first foreground image and a first background image from the reduced image;
   a first continuous tone converting part converting, into a continuous tone, a halftone dot pattern of the first background image extracted from the reduced image; and
   a combining part combining the first background image of which first background image the halftone dot pattern is converted into the continuous tone by said first continuous tone converting part and images based on the first foreground image extracted by said first extracting part.

2. The image processing apparatus as claimed in claim 1, wherein the first continuous tone converting part comprises:
   a window setting part setting a window having a predetermined size to the extracted first background image; and
   a converting part setting an average value of color in each window to the pixels in the window and thereby converting the halftone dot pattern into the continuous tone.

3. The image processing apparatus as claimed in claim 2, wherein the converting part sets a first run segmenting a line along a first direction in the window so as to obtain an average value of color for each first run, sets a second run segmenting a line along a second direction orthogonal to the first direction in the window so as to obtain an average value of color for each second run, and thereby obtains the average value of color in the window.

4. The image processing apparatus as claimed in claim 2, wherein the first continuous tone converting part comprises:
   an edge detecting part detecting an edge from the first background image subjected to a continuous tone conversion process of converting the halftone dot pattern of the extracted first background image into the continuous tone;
   a comparing and determining part comparing the detected edge with an edge of the first background image before the continuous tone conversion process and determining whether or not the detected edge exists in the first background image before the continuous tone conversion process; and
   a re-converting part performing the continuous tone conversion process again on surroundings of the detected edge when, as a result of the comparison and determination, it is determined that the detected edge does not exist in the first background image before the continuous tone conversion process.

5. The image processing apparatus as claimed in claim 4, wherein, for each pixel, the comparing and determining part obtains a difference between an edge strength of the background image before the continuous tone conversion process and an edge strength calculated by the edge detecting part through subtracting the edge strength of the background image from the calculated edge strength and, when the difference is equal to or more than a predetermined threshold value, determines that the detected edge does not exist in the first background image before the continuous tone conversion process.

6. The image processing apparatus as claimed in claim 5, wherein the re-converting part sets a size of the window set by the window setting part smaller than the size in the previous continuous tone conversion process.

7. The image processing apparatus as claimed in claim 4, wherein the re-converting part sets a size of the window set by the window setting part smaller than the size in the previous continuous tone conversion process.

8. The image processing apparatus as claimed in claim 1, wherein the first extracting part distinctly extracts the first foreground image and the first background image from the reduced image by performing extraction of an edge and binarization on the reduced image.

9. The image processing apparatus as claimed in claim 1, wherein the first extracting part distinctly extracts the first foreground image and the first background image by performing extraction of an edge on the reduced image.

10. The image processing apparatus as claimed in claim 1, wherein the first extracting part distinctly extracts the first foreground image and the first background image by performing binarization on the reduced image.

11. The image processing apparatus as claimed in claim 1, further comprising:
    a second extracting part distinctly extracting a second foreground image and a second background image from an area of the original image, the area corresponding to the first foreground image extracted from the reduced image; and
    a second continuous tone converting part converting, into a second continuous tone, a halftone dot pattern of the second background image extracted from the area of the original image,
    wherein the combining part combines the first background image of which first background image the halftone dot pattern is converted into the continuous tone by the first continuous tone converting part, the second foreground image extracted by said second extracting part, and the second background image of which second background image the halftone dot pattern is converted into the second continuous tone by said second continuous tone converting part.

12. The image processing apparatus as claimed in claim 11, wherein at least one of the first and second continuous tone converting parts comprises:
    a window setting part setting a window having a predetermined size to one of the extracted first and the extracted second background images; and
    a converting part setting an average value of color in each window to pixels in the window and thereby converting the halftone dot pattern into the continuous tone.

13. The image processing apparatus as claimed in claim 12, wherein the converting part sets a first run segmenting a line along a first direction in the window so as to obtain an average value of color for each first run, sets a second run segmenting a line along a second direction orthogonal to the first direction in the window so as to obtain an average value-of color for each second run, and thereby obtains the average value of color in the window.

14. The image processing apparatus as claimed in claim 13, wherein at least one of the first and second continuous tone converting parts comprises:
    an edge detecting part detecting an edge from a corresponding one of the first and second background images subjected to a continuous tone conversion process of converting the halftone dot pattern of the one of the extracted first and second background images into the continuous tone;
    a comparing and determining part comparing the detected edge with an edge of the one of the first and second background images before the continuous tone conversion process and determining whether or not the detected edge exists in the one of the first and second background images before the continuous tone conversion process; and
    a re-converting part performing the continuous tone conversion process again on surroundings of the detected edge when, as a result of the comparison and determination, it is determined that the detected edge does not exist in the one of the first and second background images before the continuous tone conversion process.

15. The image processing apparatus as claimed in claim 14, wherein, for each pixel, the comparing and determining part obtains a difference between an edge strength of the background image before the continuous tone conversion process and an edge strength calculated by the edge detecting part through subtracting the edge strength of the background image from the calculated edge strength and, when the difference is equal to or more than a predetermined threshold value, determines that the detected edge does not exist in the one of the first and second background images before the continuous tone conversion process.

16. The image processing apparatus as claimed in claim 15, wherein the re-converting part sets a size of the window set by the window setting part smaller than the size in the previous continuous tone conversion process.

17. The image processing apparatus as claimed in claim 14, wherein the re-converting part sets a size of the window set by the window setting part smaller than the size in the previous continuous tone conversion process.

18. The image processing apparatus as claimed in claim 12, wherein at least one of the first and second continuous tone converting parts comprises:
    an edge detecting part detecting an edge from a corresponding one of the first and second background images subjected to a continuous tone conversion process of converting the halftone dot pattern of the one of the extracted first and second background images into the continuous tone;
    a comparing and determining part comparing the detected edge with an edge of the one of the first and second background images before the continuous tone conversion process and determining whether or not the detected edge exists in the one of the first and second background images before the continuous tone conversion process; and
    a re-converting part performing the continuous tone conversion process again on surroundings of the detected edge when, as a result of the comparison and determination, it is determined that the detected edge does not exist in the one of the first and second background images before the continuous tone conversion process.

19. The image processing apparatus as claimed in claim 18, wherein, for each pixel, the comparing and determining part obtains a difference between an edge strength of the background image before the continuous tone conversion process and an edge strength calculated by the edge detecting part through subtracting the edge strength of the background image from the calculated edge strength and, when the difference is equal to or more than a predetermined threshold value, determines that the detected edge does not exist in the one of the first and second background images before the continuous tone conversion process.

20. The image processing apparatus as claimed in claim 19, wherein the re-converting part sets a size of the window set by the window setting part smaller than the size in the previous continuous tone conversion process.

21. The image processing apparatus as claimed in claim 18, wherein the re-converting part sets a size of the window set by the window setting part smaller than the size in the previous continuous tone conversion process.

22. The image processing apparatus as claimed in claim 11, wherein the first extracting part distinctly extracts the first foreground image and the first background image from the reduced image by performing extraction of an edge and binarization on the reduced image.

23. The image processing apparatus as claimed in claim 22, wherein the second extracting part distinctly extracts the second foreground image and the second background image by performing the extraction of the edge and the binarization on the first foreground image extracted from the reduced image.

24. The image processing apparatus as claimed in claim 22, wherein the second extracting part distinctly extracts the second foreground image and the second background image by performing the extraction of the edge on the first foreground image extracted from the reduced image.

25. The image processing apparatus as claimed in claim 22, wherein the second extracting part distinctly extracts the second foreground image and the second background image by performing the binarization on the first foreground image extracted from the reduced image.

26. The image processing apparatus as claimed in claim 11, wherein the first extracting part distinctly extracts the first foreground image and the first background image from the reduced image by performing extraction of an edge on the reduced image.

27. The image processing apparatus as claimed in claim 26, wherein the second extracting part distinctly extracts the second foreground image and the second background image by performing the extraction of the edge and binarization on the first foreground image extracted from the reduced image.

28. The image processing apparatus as claimed in claim 26, wherein the second extracting part distinctly extracts the second foreground image and the second background image by performing the extraction of the edge on the first foreground image extracted from the reduced image.

29. The image processing apparatus as claimed in claim 26, wherein the second extracting part distinctly extracts the second foreground image and the second background image by performing the binarization on the first foreground image extracted from the reduced image.

30. The image processing apparatus as claimed in claim 11, wherein the first extracting part distinctly extracts the first foreground image and the first background image from the reduced image by performing binarization on the reduced image.

31. The image processing apparatus as claimed in claim 30, wherein the second extracting part distinctly extracts the second foreground image and the second background image by performing extraction of an edge and the binarization on the first foreground image extracted from the reduced image.

32. The image processing apparatus as claimed in claim 30, wherein the second extracting part distinctly extracts the foreground image and the background image by performing extraction of an edge on the first foreground image extracted from the reduced image.

33. The image processing apparatus as claimed in claim 30, wherein the second extracting part distinctly extracts the second foreground image and the second background image by performing the binarization on the first foreground image extracted from the reduced image.

34. An image processing program interpreted by a computer, comprising the instructions of:
   causing the computer to generate a reduced image having, a lower resolution than that of an original image, the original image being a digital image;
   causing the computer to distinctly extract a first foreground image and a first background image from the reduced image;
   causing the computer to convert, into a continuous tone, a halftone dot pattern of the first background image extracted from the reduced image; and
   causing the computer to combine the first background image of which first background image the halftone dot pattern is converted into the continuous tone by the instruction of causing the computer to convert the halftone dot pattern into the continuous tone and images based on the first foreground image extracted by the instruction of causing the computer to distinctly extract the first foreground image and the first background image.

35. The image processing program as claimed in claim 34, wherein the instruction of causing the computer to convert the halftone dot pattern of the first background image into the continuous tone comprises the instructions of:
   causing the computer to set a window having a predetermined size to the extracted first background image; and
   causing the computer to set an average value of color in each window to pixels in the window and thereby converting the halftone dot pattern into the continuous tone.

36. The image processing program as claimed in claim 35, wherein in the instruction of causing the computer to set the average value of the color in each window to the pixels in the window, a first run segmenting a line along a first direction in the window is set so as to obtain an average value of color for each first run, a second run segmenting a line along a second direction orthogonal to the first direction in the window is set so as to obtain an average value of color for each second run, and thereby the average value of color in the window is obtained.

37. The image processing program as claimed in claim 35, wherein the instruction of causing the computer to convert the halftone dot pattern of the first background image into the continuous tone comprises the instructions of:
   causing the computer to detect an edge from the first background image subjected to a continuous tone conversion process of converting the halftone dot pattern of the extracted first background image into the continuous tone;
   causing the computer to compare the detected edge with an edge of the first background image before the continuous tone conversion process and determine whether or not the detected edge exists in the first background image before the continuous tone conversion process; and causing the computer to perform the continuous tone conversion process again on surroundings of the detected edge when, as a result of the comparison and the determination, it is determined that the detected edge does not exist in the first background image before the continuous tone conversion process.

38. The image processing program as claimed in claim 37, wherein in the instruction of causing the computer to compare the detected edge with the edge of the first background image, for each pixel, a difference between an edge strength of the background image before the continuous tone conversion process and an edge strength calculated in the instruction of causing the computer to detect the edge from the first background image is obtained through subtracting the edge strength of the background image from the calculated edge strength and, when the difference is equal to or more than a predetermined threshold value, it is determined that the detected edge does not exist in the first background image before the continuous tone conversion process.

39. The image processing program as claimed in claim 38, wherein in the instruction of causing the computer to perform the continuous tone conversion process again, a size of the window set in the instruction of setting the window is set smaller than the size in the previous continuous tone conversion process.

40. The image processing program as claimed in claim 37, wherein in the instruction of causing the computer to perform the continuous tone conversion process again, a size of the window set in the instruction of setting the window is set smaller than the size in the previous continuous tone conversion process.

41. The image processing program as claimed in claim 34, further comprising the instructions of:

causing the computer to distinctly extract a second foreground image and a second background image from an area of the original image, the area corresponding to the first foreground image extracted from the reduced image; and causing the computer to convert, into a second continuous tone, a halftone dot pattern of the second background image extracted from the area of the original image, wherein in the instruction of causing the computer to combine, the first background image of which first background image the halftone dot pattern is converted into the continuous tone in the instruction of causing the computer to converting the halftone dot pattern of the first background image into the continuous tone, the second foreground image extracted in the instruction of causing the computer to distinctly extract the second foreground image and the second background image, and the second background image of which second background image the halftone dot pattern is converted into the second continuous tone in the instruction of causing the computer to convert the halftone dot pattern of the second background image into the second continuous tone are combined.

42. The image processing program as claimed in claim 41, wherein at least one of the instructions of causing the computer to convert the halftone dot pattern of the first background image into the continuous tone and causing the computer to convert the halftone dot pattern of the second background image into the continuous tone comprises the instructions of:

causing the computer to set a window having a predetermined size to a corresponding one of the first and second background images; and causing the computer to set an average value of color in each window to pixels in the window and thereby converting the halftone dot pattern into the continuous tone.

43. The image processing program as claimed in claim 42, wherein in. the instruction of causing the computer to set the average value of color in each window to the pixels in the window, a first run segmenting a line along a first direction in the window is set so as to obtain an average value of color for each first run, a second run segmenting a line along a second direction orthogonal to the first direction in the window is set so as to obtain an average value of color for each second run, and thereby the average value of the color in the window is obtained.

44. The image processing program as claimed in claim 42, wherein at least one of the instructions of causing the computer to convert the halftone dot pattern of the fist background image into the continuous tone and causing the computer to convert the halftone dot pattern of the second background image into the continuous tone comprises the instructions of:

causing the computer to detect an edge from a corresponding one of the first and second background images subjected to a continuous tone conversion process of converting the halftone dot pattern of the one of the extracted first and second background images into the continuous tone;

causing the computer to compare the detected edge with an edge of the one of the first and second background images before the continuous tone conversion process and determine whether or not the detected edge exists in the one of the first and second background images before the continuous tone conversion process; and causing the computer to perform the continuous tone conversion process again on surroundings of the detected edge when, as a result of the comparison and the determination, it is determined that the detected edge does not exist in the one of the first and second background image before the continuous tone conversion process.

45. The image processing program as claimed in claim 44, wherein in the instruction of causing the computer to compare the detected edge with the edge of the one of the first and second background images, for each pixel,.a difference between an edge strength of the background image before the continuous tone conversion process and an edge strength calculated in the instruction of causing the computer to detect the edge from the corresponding one of the first and second background images is obtained through subtracting the edge strength of the background image from the calculated edge strength and, when the difference is equal to or more than a predetermined threshold value, it is determined that the detected edge does not exist in the one of the first and second background images before the continuous tone conversion process.

46. The image processing program as claimed in claim 45, wherein in the instruction of causing the computer to perform the continuous tone conversion process again, a size of the window set in the instruction of setting the window is set smaller than the size in the previous continuous tone conversion process.

47. The image processing program as claimed in claim 44, wherein in the instruction of causing the computer to perform the continuous tone conversion process again, a size of the window set in the instruction of setting the window is set smaller than the size in the previous continuous tone conversion process.

48. The image processing program as claimed in claim 41, wherein in the instruction of causing the computer to set the average value of color in each window to the pixels in the window, a first run segmenting a line along a first direction in the window is set so as to obtain an average value of color for each first run, a second run segmenting a line along a second direction orthogonal to the first direction in the window is set so as to obtain an average value of color for each second run, and thereby the average value of color in the window is obtained.

49. A processor-readable storage medium storing an image processing program interpreted by a computer, said image processing program comprising the instructions of:

causing the computer to generate a reduced image having a lower resolution than that of an original image, the original image being a digital image;

causing the computer to distinctly extract a first foreground image and a first background image from the reduced image;

causing the computer to convert, into a continuous tone, a halftone dot pattern of the first background image extracted from the reduced image; and causing the computer to combine the first background image of which first background image the halftone dot pattern is converted into the continuous tone by the instruction of causing the computer to convert the halftone dot pattern into the continuous tone and an image based on the first foreground image extracted by the instruction of causing the computer to distinctly extract the first foreground image and the first background image.

* * * * *